US006912956B2

(12) United States Patent
Mori

(10) Patent No.: US 6,912,956 B2
(45) Date of Patent: Jul. 5, 2005

(54) PRINTING PLATE MATERIAL

(75) Inventor: Takahiro Mori, Hachioji (JP)

(73) Assignee: Konica Minolta Holdings, Inc. (JP)

(*) Notice: Subject to any disclaimer, the term of this patent is extended or adjusted under 35 U.S.C. 154(b) by 0 days.

(21) Appl. No.: 10/692,659

(22) Filed: Oct. 24, 2003

(65) Prior Publication Data

US 2004/0103805 A1 Jun. 3, 2004

(30) Foreign Application Priority Data

Nov. 1, 2002 (JP) ....................................... 2002-319664

(51) Int. Cl.$^7$ ............................ B41N 1/00; B41M 5/26; G11B 7/24; G03C 1/494

(52) U.S. Cl. ....................... 101/459; 101/456; 101/454; 101/457; 101/467; 430/270.1; 430/273.1; 430/278.1; 430/302

(58) Field of Search ................................ 101/459, 456, 101/454, 457, 467; 430/270.1, 273.1, 278.1, 302

(56) References Cited

U.S. PATENT DOCUMENTS 5,807,659 A * 9/1998 Nishimiya et al. .......... 430/302
6,242,156 B1 * 6/2001 Teng ........................ 430/270.1
6,324,978 B1 * 12/2001 Kaulen et al. .............. 101/459
6,495,310 B2 * 12/2002 Teng .......................... 430/303
6,620,573 B2 * 9/2003 Van Damme et al. ... 430/270.1
6,670,096 B2 * 12/2003 Kawamura et al. ...... 430/271.1

FOREIGN PATENT DOCUMENTS

JP 10000869 A * 1/1998 ............ B41N/3/03

* cited by examiner

*Primary Examiner*—Andrew H. Hirshfeld
*Assistant Examiner*—Marvin P. Crenshaw
(74) *Attorney, Agent, or Firm*—Muserlian, Lucas and Mercanti

(57) ABSTRACT

Disclosed is a printing plate material comprising a substrate and a component layer provided thereon, the substrate having a center line average surface roughness Ra of from 0.2 to 1.0 μm, and an oil-retention volume A2 of from 1 to 10, wherein the center line average surface roughness Ra is obtained from three dimension surface roughness measurement according to JIS-B-0601, and wherein an image is capable of being recorded on the component layer by imagewise exposure of infrared laser.

11 Claims, 2 Drawing Sheets

PRINTING PLATE MATERIAL

FIELD OF THE INVENTION

The present invention relates to a printing plate material, and particularly to a printing plate material capable of forming an image by a computer to plate (CTP) system.

BACKGROUND OF THE INVENTION

The printing plate material for CTP, which is inexpensive, can be easily handled, and has a printing ability comparable with that of a PS plate, is required accompanied with the digitization of printing data. Recently, a versatile thermal processless printing plate material has been noticed which can be applied to a printing press employing a direct imaging (DI) process without development by a special developing agent, and treated in the same manner as in PS plates.

In a printing plate material comprising a metal substrate, particularly a grained aluminum substrate, and provided thereon, a component layer comprising a functional layer on which an image is recorded by imagewise exposure of infrared laser, sensitivity for image formation varies due to a balance between quantity of heat generated during the exposure by a light heat conversion material, contained in the functional layer or another layer component layer, and heat diffusion onto the substrate. The balance is greatly affected by the thickness of the component layer comprising a functional layer.

Since the surface of the grained aluminum substrate ordinarily has a convexoconcave structure from sub microns to scores of microns, a component layer provided on the substrate has a microscopic thickness distribution corresponding to the convexoconcave structure of the substrate, and is considered to have sensitivity differing due to the microscopic thickness distribution. Therefore, when a printing plate material having a broad layer thickness distribution is exposed, exposure may be excessive in some portions of the material but insufficient in other portions of the material, which may result in lowering of latitude of exposure.

In a printing plate material comprising an grained aluminum plate, which is imagewise exposed and developed to form an image, developability is affected by the convexoconcave structure of the grained aluminum plate surface, and particularly, a printing plate material comprising an aluminum plate having deep pits on the surface and a component layer provided thereon is difficult to develop on account of the component layer deeply incorporated in the pits. In contrast, a printing plate material comprising a component layer prepared so as to be easily removed on development, although incorporated in the deep pits, results in problem in that strength of the layer is lowered at image portions. Accordingly, such a printing plate material as aforementioned has a tendency to reduce latitude for development.

In order to solve the above problem, a printing plate material is disclosed in for example, Japanese Patent O.P.I. Publication No. 2002-99092, which comprises a surface-roughened aluminum plate and a recording layer provided thereon, the plate having a 80° glossiness of not more than 30, and having ten or less pits with an opening width of not less than 10 μm per a length of 1 mm or ten or less pits with a maximum depth in the direction perpendicular to the width of not less than 1.7 μm per a length of 1 mm, and the recording layer containing an infrared absorbing agent, and a water-insoluble and aqueous alkali solution-soluble polymer, which increases alkali solubility after infrared laser exposure. It is considered that the aluminum plate having such a surface configuration as provided above can reduce a residual layer after development. However, such a provision cannot be regarded as meeting necessary and sufficient conditions for a substrate surface configuration. It is extremely insufficient for a surface configuration of an aluminum plate used in a printing plate material comprising a water-developable component layer, particularly a processless printing plate of development on press type.

So far, detailed study has not been made on a minute surface configuration of a grained aluminum plate suitable for a processless printing plate material.

SUMMARY OF THE INVENTION

The present invention has been made in view of the above. An object of the invention is to provide a printing plate material, which is capable of recording an image employing infrared laser, exhibiting improved sensitivity and developability and giving high image quality.

DETAILED DESCRIPTION OF THE INVENTION

Figure 1:
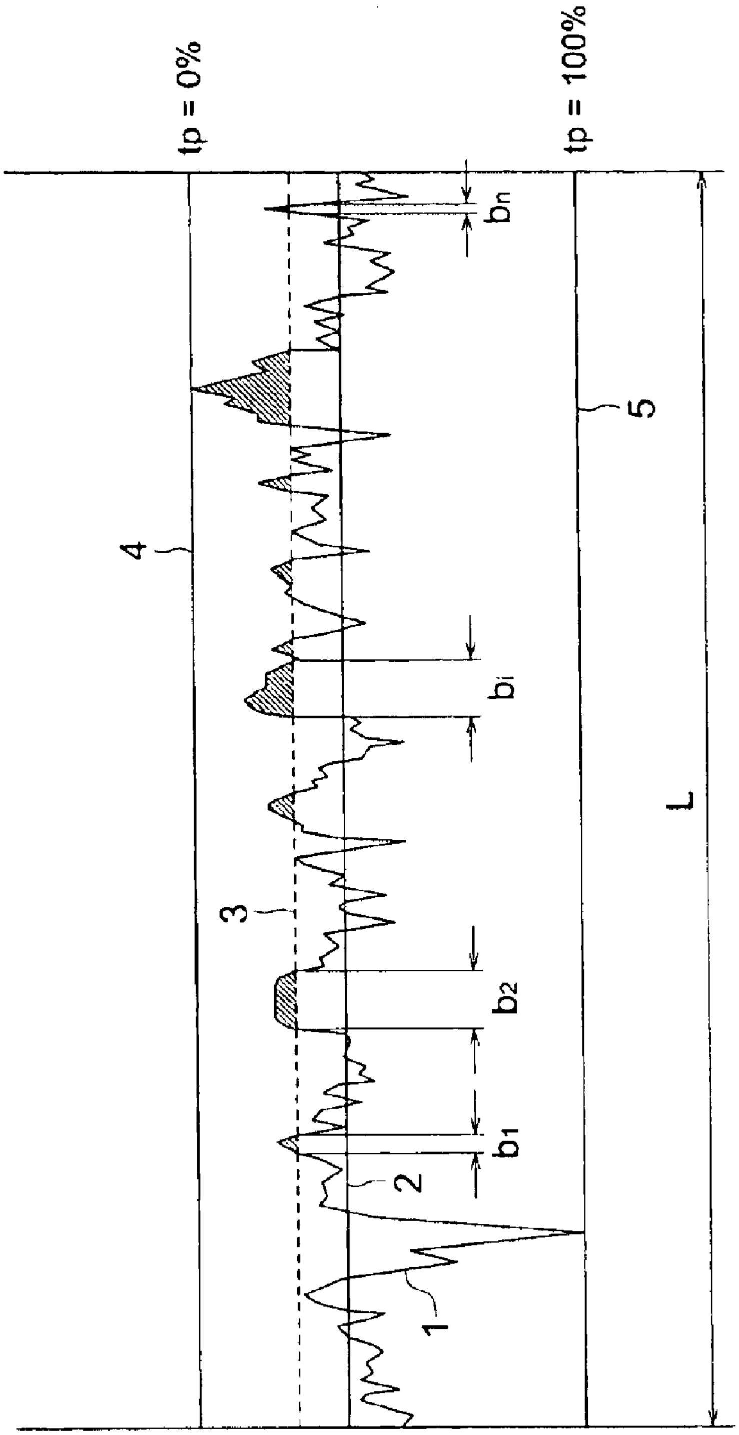
FIG. 1 is a graph showing one example of a roughness curve used for measuring bearing length ratio in the invention.

The above object has been attained by one of the following constitutions:

1. A printing plate material comprising a substrate and provided thereon, a component layer, the substrate having a center line average surface roughness Ra of from 0.2 to 1.0 μm, and an oil-retention volume A2 of from 1 to 10, wherein the center line average surface roughness Ra is obtained from three dimension surface roughness measurement according to JIS-B-0601, and wherein an image is capable of being recorded on the component layer by imagewise exposure of infrared laser.

2. The printing plate material of item 1 above, wherein the substrate is an aluminum or aluminum alloy plate which has been subjected to surface roughening treatment, followed by anodizing treatment or hydrophilization treatment.

3. The printing plate material of item 1 above, wherein the substrate is a surface roughened aluminum or aluminum alloy plate having deep pits charged with a hydrophilic material or an oleophilic material.

4. The printing plate material of item 1 above, wherein the oil-retention volume A2 is from 2 to 8.

5. The printing plate material of item 1 above, the component layer being an oleophilic layer, wherein the printing plate material is positive working, and the oleophilic layer at exposed portions is capable of being removed by development on press.

6. The printing plate material of item 5 above, wherein the oleophilic layer varies from hydrophobic to hydrophilic by heating.

7. The printing plate material of item 1 above, the component layer being comprised of an oleophilic layer and a hydrophilic layer provided on the oleophilic layer, wherein the printing plate material is negative working, and the hydrophilic layer at exposed portions is capable of being removed by development on press.

8. The printing plate material of item 1 above, the component layer being comprised of a hydrophilic layer and an oleophilic layer provided on the hydrophilic layer, wherein the printing plate material is positive working, and the oleophilic layer at exposed portions is capable of being removed by development on press.

9. The printing plate material of item 1 above, the component layer being capable of being removed by development on press and containing heat melting particles or heat fusible particles, wherein the printing plate material is negative working, and the component layer at exposed portions is incapable of being removed by development on press.

10. The printing plate material of item 1 above, wherein the printing material after image recording is capable of being developed with water.

11. The printing plate material of item 1 above, wherein the printing material after image recording is capable of being developed on a printing press by supplying a dampening water and/or printing ink.

2-1 A printing plate material comprising a substrate and provided thereon, a component layer comprising a functional layer on which an image is capable of being recorded by imagewise exposure of infrared laser, the substrate having a center line average surface roughness Ra of from 0.2 to 1.0 $\mu$m, and an oil-retention volume A2 of from 1 to 10, wherein the center line average surface roughness Ra is obtained from three dimension surface roughness measurement according to JIS-B-0601.

2-2 The printing plate material of item 2-1 above, wherein at least a part of the component layer after image recording is capable of being removed with water or by development on press.

2-3 The printing plate material of item 2-1 or 2-2 above, wherein the substrate is an aluminum or aluminum alloy plate which has been subjected to surface roughening treatment, anodizing treatment or hydrophilization treatment.

2-4 The printing plate material of any one of items 2-1 through 2-3 above, wherein the substrate is a surface roughened aluminum or aluminum alloy plate having deep pits selectively charged with a hydrophilic material or an oleophilic material.

2-5 The printing plate material of any one of items 2-1 through 2-4 above, wherein the oil-retention volume A2 is from 2 to 8.

2-6 The printing plate material of any one of items 2-1 through 2-5 above, wherein the printing plate material is positive working, and the component layer is an oleophilic layer whose exposed portions are capable of being removed by development on press.

2-7 The printing plate material of item 2-6 above, wherein the oleophilic layer varies from hydrophobic to hydrophilic by heating.

2-8 The printing plate material of any one of items 2-1 through 2-5 above, the component layer being comprised of an oleophilic layer and a hydrophilic layer provided on the oleophilic layer, wherein the printing plate material is negative working, and at least a part of the hydrophilic layer at exposed portions is capable of being removed by development on press.

2-9 The printing plate material of any one of items 2-1 through 2-5 above, the component layer being comprised of a hydrophilic layer and an oleophilic layer provided on the hydrophilic layer, wherein the printing plate material is positive working, and at least a part of the oleophilic layer at exposed portions is capable of being removed by development on press.

2-10 The printing plate material of any one of items 2-1 through 2-5 above, the component layer being capable of being removed by development on press and containing heat melting particles or heat fusible particles, wherein the printing plate material is negative working, and the component layer at exposed portions is incapable of being removed by development on press.

The printing plate material of the invention comprises a substrate and provided thereon, a component layer comprising a functional layer on which an image is recorded by imagewise exposure of infrared laser, the substrate having a center line average surface roughness Ra of from 0.2 to 1.0 $\mu$m, and an oil-retention volume A2 of from 1 to 10, the center line average surface roughness Ra being obtained from three dimension surface roughness measurement according to JIS-B-0601, and the oil-retention volume A2 being a parameter expressing a surface configuration of the substrate.

In the invention, the center line average surface roughness Ra' ($\mu$m) obtained from the three dimension surface roughness measurement is defined according to JIS-B-0601 in the JIS surface roughness. When a roughness curve obtained by measuring at a cut-off value of 0.8 mm is represented by formula Y=f(X) in the coordinates in which the direction of the center line of the curve is set as the X-axis and the longitudinal magnification direction perpendicular to the X-axis is set as the Y-axis, the center line average surface roughness Ra' ($\mu$m) measured from analog measurement is represented by the following equation 1:

$$Ra' = \frac{1}{L}\int_0^L |f(x)|\,dx \quad \text{Equation 1}$$

wherein L is a length to be measured.

The center line average surface roughness Ra ($\mu$m) according to digital measurement is obtained from the following.

Measuring M (by number) heights in an X direction and N (by number) heights in a Y direction, total MN (by number) heights, at a specific sample length, a roughness curved plane and its average roughness curved plane are determined. When the absolute value of the difference between each of the measured heights and the average roughness curved plane is expressed by Z, the center line average surface roughness Ra ($\mu$m) measured from digital measurement is represented by the following equation 2.

$$Ra = \frac{1}{MN}\sum_{k=1}^{M}\sum_{j=1}^{N}|f(Z_{jk})| \qquad \text{Equation 2}$$

In the above equation 2, $f(Z_{jk})$ represents a value of Z at a point which is the jth point in the X direction and the kth point in the Y direction.

In the invention, the center line average surface roughness Ra is measured by means of a non-contact type three dimension microscopic surface configuration measuring system RSTPLUS produced by WYKO Co., Ltd.

In the invention, the center line average surface roughness Ra of not less than 0.2 $\mu$m provides a broad latitude of water amount supplied during printing or high printing durability, while the center line average surface roughness Ra of not more than 1.0 $\mu$m makes it possible to properly control the thickness of the component layer, providing a broad latitude in sensitivity or developability.

Next, oil-retention volume A2 , which is one of the surface configuration parameters defined in the invention, will be explained in detail.

The oil-retention volume A2 , referred to in the invention, is a parameter determined from the bearing area curve drawn based on the data obtained by measuring the three dimension surface configuration in the same manner as described above, and can be determined according to the following procedures.

<<1. Preparation of Roughness Curve>>

The roughness curve of a substrate surface is obtained according to a method defined in JIS-B-0601. As a measuring device used for measuring a surface roughness curve, the non-contact type three dimension microscopic surface configuration measuring system RSTPLUS produced by WYKO Co., Ltd. described above is cited.

<<2. Measurement of Bearing Length Ratio tp>>

FIG. 1 is a diagram showing one example of a roughness curve used for measuring the bearing length ratio.

In FIG. 1, a roughness curve 1, which is obtained according to the method described above, has a standard length L ($\mu$m) in the direction of an average roughness line 2, the highest peak line 4 contains the highest peak point and is parallel to the average roughness line 2, and the deepest valley line 5 contains the deepest valley point and is parallel to the average roughness line 2.

The bearing length ratio tp is represented by the following formula:

$$tp\ (\%) = (\eta p/L) \times 100,$$

$$\eta p(\mu m) = b_1 + b_2 \ldots + b_i \ldots + b_n$$

wherein $b_1$, $b_2$, . . . $b_i$ . . . , and $b_n$ represent lengths ($\mu$m) of the sectional lines obtained when the roughness curve 1 is cut with a cutting line 3 parallel with the highest peak line 4, and L ($\mu$m) represents a standard length (to be measured).

<<3. Measurement of Oil-Retention Volume A2 >>

Figure 2:
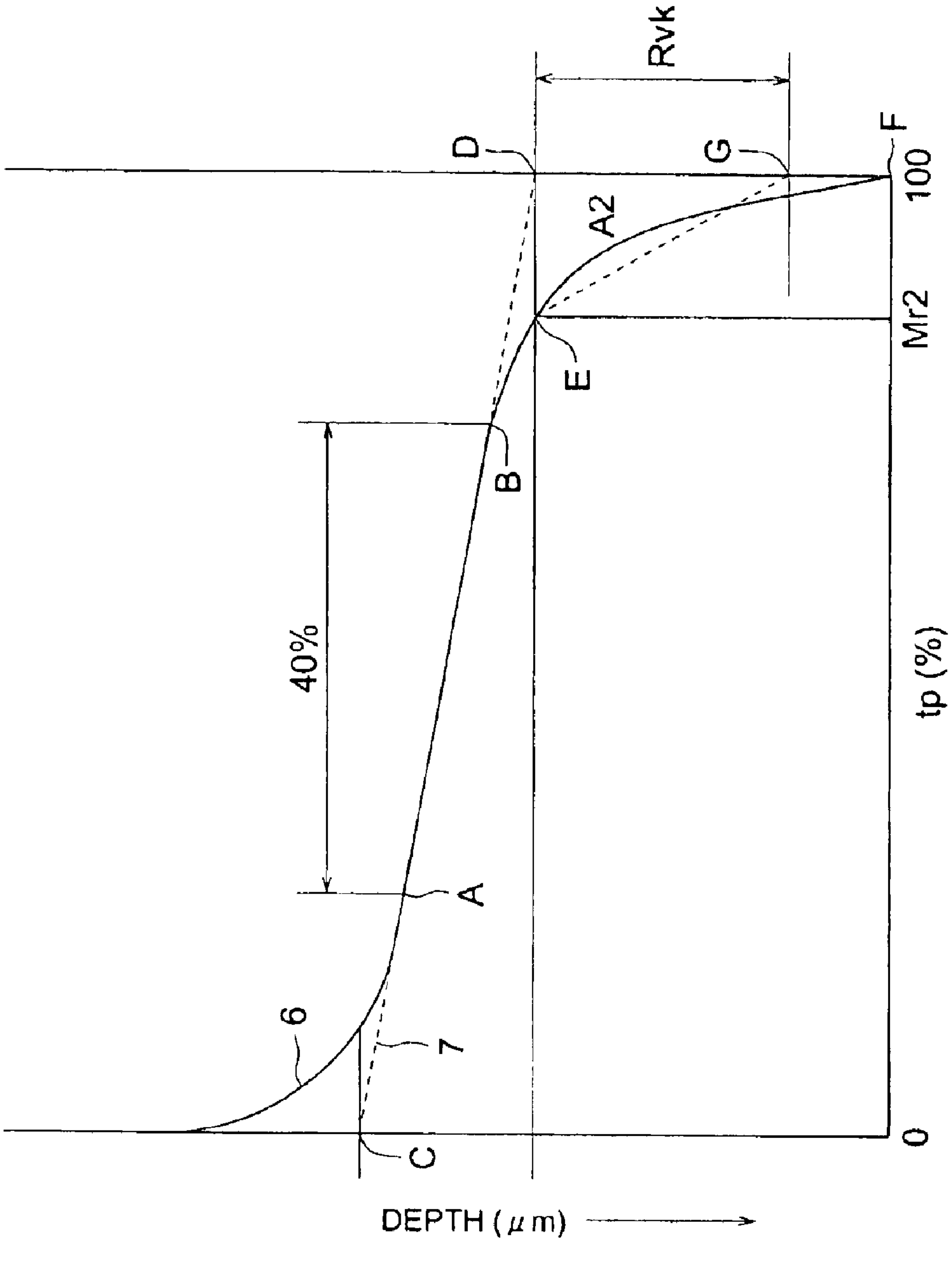
FIG. 2 is a graph showing one example of a bearing area curve for determining oil-retention volume A2 in the invention.

Subsequently, cutting the roughness curve 1 of FIG. 1 with cutting line 3 whose position (depth $\mu$m) varies from the highest peak line 4 (in which tp is 0%) to the deepest valley line 5 (in which tp is 100%), bearing length ratio tp at each depth to be measured is determined. FIG. 2 is a bearing area curve 6 in which the ordinate shows the depth ($\mu$m) and the abscissa the bearing length ratio tp (%).

In FIG. 2, find a line 7 which has the minimum slope among lines which contain points A and B on the curve 6 showing a difference of tp (%) of 40%. A point C is an intercept where the line 7 crosses the axis of tp 0%, and a point D is an intercept where the line 7 crosses the axis of tp 100%. A point E is a point where the bearing area curve 6 crosses a line parallel to the abscissa containing the point D, and a point F is a point where the bearing area curve 6 crosses the axis of tp 100%. A point G is a point on the axis of tp 100%, in which the area of the portions surrounded by segments DE and DF, and curve EF is the same as that of the triangle DEG.

As a surface roughness parameter, the DG distance is defined as oil retention depth Rvk ($\mu$m), the tp value at point E as bearing length ratio 2 Mr2 (%), and the area of the triangle DEG as oil-retention volume A2 .

Employing the above parameters, the oil-retention volume A2 is obtained from the following formula.

$$A2 = Rvk \times (100 - Mr2)/2$$

In the surface roughness measurement, since two dimension measurement is difficult to obtain a correct surface profile of a substrate surface, it is preferred that three dimension measurement be carried out. The oil-retention volume A2 is preferably obtained by measuring an area of not less than 100 $\mu$m×100 $\mu$m employing a measuring apparatus capable of measuring with a degree of dissolution of not lower than 1 $\mu$m×1 $\mu$m.

The thus obtained oil-retention volume A2 is a parameter showing a volume ratio of valley portions in the surface configuration of a substrate. Typically with respect to a surface roughened aluminum plate to be described later, it is a parameter showing a volume ratio of pits deeper than a specific depth (for example, a depth corresponding to Mr2). It is apparent that when the aluminum substrate is coated with a component layer, the layer thickness at the deeper pits is larger. Accordingly, the oil-retention volume A2 has a close relationship with a layer thickness distribution of the component layer.

The present inventor has made an extensive study on printing plate materials. As a result, it has been found that it is necessary that the oil-retention volume A2 described above be from 1 to 10, in order to obtain a printing plate material providing excellent sensitivity, developability and imaging performances, and the present invention has been completed. The oil-retention volume A2 is preferably from 2 to 8.

An oil-retention volume A2 of not less than 1 provides a surface with a convexoconcave structure necessary to realize a good printing performance, and an oil-retention volume A2 of not more than 10 provides a good layer thickness distribution of a layer provided on a substrate.

A printing plate material, comprising a substrate having a surface configuration defined as described above and provided thereon, a component layer, can obtain excellent effects of the invention, even when the component layer after imagewise exposure requires alkali development. Such a printing plate material can provide the most excellent effects when a printing material after image recording is one capable of being developed with water, or of being developed on a printing press by supplying a dampening water and/or printing ink, in other words, the component layer to be removed after imagewise exposure is one capable of being removed with water or by development on press. Development on press herein referred to means development carried out by supplying dampening water and/or printing ink to a printing plate material mounted on a plate cylinder of a printing press.

Generally in the printing plate material comprising the component layer described above, the component layer at portions to be removed should be a layer with a low strength to the extent that it can be removed with water or with a dampening water and/or printing ink on a printing press, while the component layer at portions not to be removed should be a layer with a high strength to the extent that it can provide a printing durability capable of printing several hundred thousand copies. However, it is difficult to make a great difference between portions to be removed and not to be removed. Accordingly, a convexoconcave structure of a substrate surface at portions to be removed has a great influence on the removability. This tendency may be greatly marked when an attempt is made to increase printing durability.

The thickness of the component layer is preferably smaller, since it is preferred that the component layer has a surface with a convexoconcave structure employing that of the substrate surface, when it is employed as non-image portions during printing. The total thickness of the component layer is preferably not more than 5 g/m$^2$, and more preferably from 0.1 to 3 g/m$^2$.

When the component layer is employed as image portions during printing, it is preferred that the substrate surface itself is employed as non-image portions. Accordingly, the configuration surface of the component layer is not so important, however, the component layer at non-image portions need be removed which produces development load. Therefore, the total thickness of the component layer is preferably not more than 5 g/m$^2$, and more preferably from 0.1 to 3 g/m$^2$.

Next, the substrate in the invention will be explained.

As the substrate to be used in the invention, known substrates used as a substrate of a printing plate material can be used as long as they fall within the scope defined in the invention. There are, for example, metal plate substrates, plastic film substrates, paper sheet substrates treated with polyolefins, and composite substrates obtained by suitably laminating the aforementioned substrates. The thickness of the substrate is not specifically limited as long as a printing plate material having the substrate can be mounted on a printing press, but the substrate with a thickness of from 50 to 500 $\mu$m is generally easy to handle.

Examples of the metal plates include plates of iron, stainless steel, and aluminum. In the invention, an aluminum or aluminum alloy plate (hereinafter also referred to as aluminum plate) is preferred in view of its gravity or stiffness. An aluminum plate subjected to known surface-roughening treatment, anodizing treatment or hydrophilization treatment (that is, a grained aluminum plate) is more preferred.

The aluminum plate in the invention can be prepared according to any known methods as long as an aluminum plate having a surface configuration, in which the surface characteristics (Ra and A2) fall within the range defined in the invention, can be obtained. An aluminum plate having such a surface configuration can be prepared according to, for example, a method disclosed in Japanese Patent O.P.I. Publication No. 10-869. Employing the method disclosed in this reference, an aluminum plate having an A2 of from 1 to 10 can be prepared under an appropriate electrolytic surface roughening condition.

As the aluminum alloy used for the substrate in the invention, there can be used various ones including an alloy of aluminum and a metal such as silicon, copper, manganese, magnesium, chromium, zinc, lead, bismuth, nickel, titanium, sodium or iron.

It is preferable that the substrate in the invention is subjected to degreasing treatment for removing rolling oil prior to surface roughening (graining). The degreasing treatments include degreasing treatment employing solvents such as trichlene and thinner, and an emulsion degreasing treatment employing an emulsion such as kerosene or triethanol. It is also possible to use an aqueous alkali solution such as caustic soda for the degreasing treatment. When an aqueous alkali solution such as caustic soda is used for the degreasing treatment, it is possible to remove soils and an oxidized film which can not be removed by the above-mentioned degreasing treatment alone. When an aqueous alkali solution such as caustic soda is used for the degreasing treatment, the resulting substrate is preferably subjected to desmut treatment in an aqueous solution of an acid such as phosphoric acid, nitric acid, sulfuric acid, chromic acid, or a mixture thereof, since smut is produced on the surface of the substrate. The surface roughening methods include a mechanical surface roughening method and an electrolytic surface roughening method electrolytically etching the substrate surface.

Though there is no restriction for the mechanical surface roughening method, a brushing roughening method and a honing roughening method are preferable. The brushing roughening method is carried out by rubbing the surface of the substrate with a rotating brush with a brush hair with a diameter of 0.2 to 0.8 mm, while supplying slurry in which volcanic ash particles with a particle size of 10 to 100 $\mu$m are dispersed in water to the surface of the substrate. The honing roughening method is carried out by ejecting obliquely slurry with pressure applied from nozzles to the surface of the substrate, the slurry containing volcanic ash particles with a particle size of 10 to 100 $\mu$m dispersed in water. A surface roughening can be also carried out by laminating a substrate surface with a sheet on the surface of which abrading particles with a particle size of from 10 to 100 $\mu$m was coated at intervals of 100 to 200 $\mu$m and at a density of $2.5\times10^3$ to $10\times10^3$/cm$^2$, and applying pressure to the sheet to transfer the roughened pattern of the sheet and roughen the surface of the substrate.

After the substrate has been roughened mechanically, it is preferably dipped in an acid or an aqueous alkali solution in order to remove abrasives and aluminum dust, etc. which have been embedded in the surface of the substrate. Examples of the acid include sulfuric acid, persulfuric acid, hydrofluoric acid, phosphoric acid, nitric acid and hydrochloric acid, and examples of the alkali include sodium hydroxide and potassium hydroxide. Among those mentioned above, an aqueous alkali solution of for example, sodium hydroxide is preferably used. The dissolution amount of aluminum in the substrate surface is preferably 0.5 to 5 g/$m^2$. After the substrate has been dipped in the aqueous alkali solution, it is preferable for the substrate to be dipped in an acid such as phosphoric acid, nitric acid, sulfuric acid and chromic acid, or in a mixed acid thereof, for neutralization.

Though there is no restriction for the electrolytic surface roughening method, a method in which the substrate is electrolytically surface roughened in an acidic electrolytic solution. Though an acidic electrolytic solution generally used for the electrolytic surface roughening can be used, it is preferable to use an electrolytic solution of hydrochloric acid or that of nitric acid. The electrolytic surface roughening method disclosed in Japanese Patent Publication No. 48-28123, British Patent No. 896,563 and Japanese Patent O.P.I. Publication No. 53-67507 can be used. In the electrolytic surface roughening method, voltage applied is generally from 1 to 50 V, and preferably from 10 to 30 V. The current density used can be selected from the range from 10 to 200 A/$dm^2$, and is preferably from 50 to 150 A/$dm^2$. The quantity of electricity can be selected from the range of from 100 to 5000 C/$dm^2$, and is preferably 100 to 2000 C/$dm^2$. The temperature during the electrolytically surface roughening may be in the range of from 10 to 50° C., and is preferably from 15 to 45° C.

When the substrate is electrolytically surface roughened by using an electrolytic solution of nitric acid, voltage applied is generally from 1 to 50 V, and preferably from 5 to 30 V. The current density used can be selected from the range from 10 to 200 A/$dm^2$, and is preferably from 20 to 100 A/$dm^2$. The quantity of electricity can be selected from the range of from 100 to 5000 C/$dm^2$, and is preferably 100 to 2000 C/$dm^2$. The temperature during the electrolytically surface roughening may be in the range of from 10 to 50° C., and is preferably from 15 to 45° C. The nitric acid concentration in the electrolytic solution is preferably from 0.1% by weight to 5% by weight. It is possible to optionally add, to the electrolytic solution, nitrates, chlorides, amines, aldehydes, phosphoric acid, chromic acid, boric acid, acetic acid or oxalic acid.

When the substrate is electrolytically surface roughened by using an electrolytic solution of hydrochloric acid, voltage applied is generally from 1 to 50 V, and preferably from 2 to 30 V. The current density used can be selected from the range from 10 to 200 A/$dm^2$, and is preferably from 50 to 150 A/$dm^2$. The quantity of electricity can be selected from the range of from 100 to 5000 C/$dm^2$, and is preferably 100 to 2000 C/$dm^2$. The temperature during the electrolytically surface roughening may be in the range of from 10 to 50° C., and is preferably from 15 to 45° C. The hydrochloric acid concentration in the electrolytic solution is preferably from 0.1% by weight to 5% by weight.

After the substrate has been electrolytically surface roughened, it is preferably dipped in an acid or an aqueous alkali solution in order to remove aluminum dust, etc. produced in the surface of the substrate. Examples of the acid include sulfuric acid, persulfuric acid, hydrofluoric acid, phosphoric acid, nitric acid and hydrochloric acid, and examples of the alkali include sodium hydroxide and potassium hydroxide. Among those mentioned above, the aqueous alkali solution is preferably used. The dissolution amount of aluminum in the substrate surface is preferably 0.5 to 5 g/$m^2$. After the substrate has been dipped in the aqueous alkali solution, it is preferable for the substrate to be dipped in an acid such as phosphoric acid, nitric acid, sulfuric acid and chromic acid, or in a mixed acid thereof, for neutralization.

The mechanical surface roughening and electrolytic surface roughening may be carried out singly, and the mechanical surface roughening followed by the electrolytic surface roughening may be carried out.

After the surface roughening, anodizing treatment may be carried out. There is no restriction in particular for the method of anodizing treatment used in the invention, and known methods can be used. The anodizing treatment forms an anodization film on the surface of the substrate. For the anodizing treatment there is preferably used a method of applying a current density of from 1 to 10 A/$dm^2$ to an aqueous solution containing sulfuric acid and/or phosphoric acid in a concentration of from 10 to 50%, as an electrolytic solution. However, it is also possible to use a method of applying a high current density to sulfuric acid as described in U.S. Pat. No. 1,412,768, a method to electrolytically etching the substrate in phosphoric acid as described in U.S. Pat. No. 3,511,661, or a method of employing a solution containing two or more kinds of chromic acid, oxalic acid, malonic acid, etc. The coated amount of the formed anodization film is suitably 1 to 50 mg/$dm^2$, and preferably 10 to 40 mg/$dm^2$. The coated amount of the formed anodization film can be obtained from the weight difference between the aluminum plates before and after dissolution of the anodization film. The anodization film of the aluminum plate is dissolved employing for example, an aqueous phosphoric acid chromic acid solution which is prepared by dissolving 35 ml of 85% by weight phosphoric acid and 20 g of chromium (IV) oxide in 1 liter of water.

The substrate which has been subjected to anodizing treatment is optionally subjected to sealing treatment. For the sealing treatment, it is possible to use known methods using hot water, boiling water, steam, a sodium silicate solution, an aqueous dicromate solution, a nitrite solution and an ammonium acetate solution.

After the above treatment, the substrate is suitably undercoated with a water soluble resin such as polyvinyl phosphonic acid, a polymer or copolymer having a sulfonic acid in the side chain, or polyacrylic acid; a water soluble metal salt such as zinc borate; a yellow dye; an amine salt; and so on, for hydrophilization treatment. The sol-gel treatment substrate disclosed in Japanese Patent O.P.I. Publication No. 5-304358, which has a functional group capable of causing addition reaction by radicals as a covalent bond, is suitably used.

As the substrate in the invention, a surface-roughened aluminum or aluminum alloy substrate having deep pits charged with a hydrophilic material or an oleophilic material can be used. The deep pit herein referred to means a pit providing a bearing length ratio of not less than 85%, and preferably not less than 90%.

In the invention, it is suitably determined according to an image formation method or a component layer applied whether the hydrophilic material is used or the oleophilic material is used as a material with which the deep pits are charged. Such a material can be given properties participating in image formation such as light heat conversion property, thermal insulation property or water developable property.

As a method for charging the deep pits with a specific material, there is a method in which a diluted solution or dispersion solution (0.1 to a few % by weight) of the material is coated on the substrate to give a dry coated amount of from 0.01 to 1 g/m$^2$.

Examples of the hydrophilic material used in the invention include metal oxide sols such as colloidal silica, alumina sol, and titania sol, silicates such as sodium silicate, potassium silicate, and lithium silicate, hydrolizable sols such as alkoxysilanes and silane coupling agents, and known hydrophilic polymers (which are optionally cross-linked with a known method).

Examples of the oleophilic material used in the invention include known polymer emulsions and known oil soluble polymers.

In the invention, the component layer is preferably an oleophilic layer in which the oleophilic layer at exposed portions is developed (removed) on a printing press to provide a positive working printing plate. The oleophilic layer preferably contains a polymer which polarity varies from hydrophobic one to hydrophilic one on heat application.

As one embodiment of the above-described component layer, there is a component layer (hereinafter also referred to as an image formation layer) containing an oleophilic polymer with a specific functional group disclosed in Japanese Patent O.P.I. Publication No. 2002-174893, which is provided on a hydrophilic substrate of a printing plate material. This printing plate material employs a so-called polarity conversion polymer varying from oleophilicity to hydrophilicity due to heat application. Examples of the polarity conversion polymer include polymers disclosed in the Japanese Patent O.P.I. Publication described above. In the invention, the component layer of the above structure can provide a printing plate material in which the component layer at exposed portions can be removed with water or by development on press.

However, this embodiment may produce variation of quantity of heat generated on exposure on account of thickness variation of an image formation layer containing a light heat conversion material resulting from the convexoconcave structure of the substrate surface. The surface of the image formation layer at thick layer regions may be ablated with an exposure energy which does not hydrophilicity at image formation layer at thin layer regions, resulting in an image with micro unevenness. Accordingly, as variation of the layer thickness is greater, the image quality is more deteriorated. Further, temperature of an image formation layer near the interface between the substrate and the image formation layer is difficult to elevate due to heat absorption of the substrate. Temperature at an image formation layer particularly with large thickness portions, i.e., near the bottom of the deep pits, where intensity of irradiated laser and a quantity of heat generated are reduced, is more difficult to elevate. Such an image formation layer at portions described above is extremely difficult to develop, coupled with the configuration of the deep pits. However, the substrate in the invention having a surface falling within the range defined in the invention can provide an intended effect of the invention.

In another embodiment of the invention, the component layer is preferably comprised of an oleophilic layer and a hydrophilic layer provided on the oleophilic layer, in which the hydrophilic layer at exposed portions is capable of being removed by development on press to provide a negative working printing plate.

As one example of this embodiment, there is a thermosensitive printing plate material disclosed in Japanese Patent O.P.I. Publication No. 2002-178657, which comprises a grained and anodized aluminum substrate and provided thereon, (1) an ink receptive layer and (2) a hydrophilic layer in that order, the hydrophilic layer containing colloidal oxides or hydroxides of at least one element selected from the group consisting of beryllium, magnesium, aluminum, silicon, titanium, boron, germanium, tin, zirconium, iron, vanadium, and antimony, wherein at least one of the ink receptive layer and hydrophilic layer contains a light heat conversion material. A water soluble protective layer may be provided on the hydrophilic layer.

In this embodiment, ablative breakage is produced by heat generated due to exposure at an interface between the ink receptive layer and the hydrophilic layer to reduce adhesion force at the interface, whereby the hydrophilic layer at exposed portions is removed by development on press to form an image, and it is preferred that the ink receptive layer (that is, oleophilic layer) contains a light heat conversion material and the hydrophilic layer is thinner. The water soluble protective layer, which may be provided on the hydrophilic layer, can prevent ablative scatter of a part of the ink receptive layer or the hydrophilic layer on exposure. This protective layer can be also removed by development on press.

This embodiment is likely to produce thickness variation of an ink receptive layer containing a light heat conversion material resulting from the convexoconcave structure of the substrate surface. An ink receptive layer at thick layer regions is ablated with an exposure energy which does not ablate an ink receptive layer at thin layer regions, resulting in an image with micro unevenness. Accordingly, as variation of the layer thickness is greater, the image quality is more deteriorated. However, the substrate in the invention having a surface falling within the range defined in the invention can provide an intended effect of the invention.

In still another embodiment of the invention, the component layer is preferably comprised of a hydrophilic layer and an oleophilic layer provided on the hydrophilic layer, in which at least a part of the oleophilic layer at exposed portions is capable of being removed by development on press to provide a positive working printing plate.

This embodiment is one in which the hydrophilic layer and the oleophilic layer are reversely provided on the substrate at the aforementioned embodiment. In this embodiment, as variation of the layer thickness is greater, the image quality is more deteriorated, but the substrate in the invention having a surface falling within the range defined in the invention can provide an intended effect of the invention.

As still another embodiment, there is one in which the component layer contains a heat melting particles or heat fusible particles and is capable of being removed by development on press, but a component layer at exposed portions cannot be removed by development on press to give a negative working printing plate.

Examples of this embodiment include a printing plate material disclosed in Japanese Patent Publication No. 2938397, comprising a hydrophilic substrate and provided thereon, a component layer containing a heat-fusible thermoplastic polymer particles, and a printing plate material disclosed in Japanese Patent O.P.I. Publication No. 9-171250, comprising a hydrophilic substrate and provided thereon, a component layer containing a heat-fusible thermoplastic polymer particles, a hydrophilic binder, and a cross-linking agent capable of cross-linking the binder.

In this embodiment, the component layer preferably contains a light heat conversion material, but the component layer containing a light heat conversion material is likely to produce variation of the layer thickness resulting from the convexoconcave structure of the substrate surface. As a result, the component layer at thin layer regions is difficult to form an image due to a small quantity of heat generated, while the surface of the image formation layer at thick layer regions is likely to ablate due to excessive quantity of heat generated. This embodiment has problems in that image formation is insufficient since heat quantity generated is small at the bottom portions of the deep pits at exposed portions, resulting in lowering of printing durability, and development is insufficient at the bottom portions of the deep pits at unexposed portions, resulting in occurrence of stain. However, a combined use of such an component layer with the substrate in the invention having a surface configuration falling within the range defined in the invention can provide an intended effect of the invention.

The component layer used in the printing plate material of the present invention will be explained below.

Materials used in the hydrophilic layer of the printing plate material will be explained below.

The component layer (hereinafter also referred to as image formation layer) in the invention can contain heat melting particles or heat fusible particles.

(Heat Melting Particles)

The heat melting particles used in the invention are particularly particles having a low melt viscosity, or particles formed from materials generally classified into wax. The materials preferably have a softening point of from 40° C. to 120° C. and a melting point of from 60° C. to 150° C., and more preferably a softening point of from 40° C. to 100° C. and a melting point of from 60° C. to 120° C. The melting point less than 60° C. has a problem in storage stability and the melting point exceeding 300° C. lowers ink receptive sensitivity.

Materials usable include paraffin, polyolefin, polyethylene wax, microcrystalline wax, and fatty acid wax. The molecular weight thereof is approximately from 800 to 10,000. A polar group such as a hydroxyl group, an ester group, a carboxyl group, an aldehyde group and a peroxide group may be introduced into the wax by oxidation to increase the emulsification ability. Moreover, stearoamide, linolenamide, laurylamide, myristylamide, hardened cattle fatty acid amide, parmitylamide, oleylamide, rice bran oil fatty acid amide, palm oil fatty acid amide, a methylol compound of the above-mentioned amide compounds, methylenebissteastearoamide and ethylenebissteastearoamide may be added to the wax to lower the softening point or to raise the working efficiency. A cumarone-indene resin, a rosin-modified phenol resin, a terpene-modified phenol resin, a xylene resin, a ketone resin, an acryl resin, an ionomer and a copolymer of these resins may also be usable.

Among them, polyethylene, microcrystalline wax, fatty acid ester and fatty acid are preferably contained. A high sensitive image formation can be performed since these materials each have a relative low melting point and a low melt viscosity. These materials each have a lubrication ability. Accordingly, even when a shearing force is applied to the surface layer of the printing plate precursor, the layer damage is minimized, and resistance to contaminations which may be caused by scratch is further enhanced.

The heat melting particles are preferably dispersible in water. The average particle size thereof is preferably from 0.01 to 10 μm, and more preferably from 0.1 to 3 μm. When a layer containing the heat melting particles is coated on a porous hydrophilic layer, the particles having an average particle size less than 0.01 μm may enter the pores of the hydrophilic layer or the valleys between the neighboring two peaks on the hydrophilic layer surface, resulting in insufficient development on press and background contaminations. The particles having an average particle size exceeding 10 μm may result in lowering of dissolving power.

The composition of the heat melting particles may be continuously varied from the interior to the surface of the particles. The particles may be covered with a different material. Known microcapsule production method or sol-gel method can be applied for covering the particles. The heat melting particle content of the layer is preferably 1 to 90% by weight, and more preferably 5 to 80% by weight based on the total layer weight.

(Heat Fusible Particles)

The heat fusible particles in the invention include thermoplastic hydrophobic polymer particles. Although there is no specific limitation to the upper limit of the softening point of the thermoplastic hydrophobic polymer particles, the softening point is preferably lower than the decomposition temperature of the polymer particles. The weight average molecular weight (Mw) of the polymer is preferably within the range of from 10,000 to 1,000,000.

Examples of the polymer consisting the polymer particles include a diene (co)polymer such as polypropylene, polybutadiene, polyisoprene or an ethylene-butadiene copolymer; a synthetic rubber such as a styrene-butadiene copolymer, a methyl methacrylate-butadiene copolymer or an acrylonitrile-butadiene copolymer; a (meth)acrylate (co) polymer or a (meth)acrylic acid (co)polymer such as polymethyl methacrylate, a methyl methacrylate-(2-ethylhexyl) acrylate copolymer, a methyl methacrylate-methacrylic acid copolymer, or a methyl acrylate-(N-methylolacrylamide); polyacrylonitrile; a vinyl ester (co)polymer such as a polyvinyl acetate, a vinyl acetate-vinyl propionate copolymer and a vinyl acetate-ethylene copolymer, or a vinyl acetate-2-hexylethyl acrylate copolymer; and polyvinyl chloride, polyvinylidene chloride, polystyrene and a copolymer thereof. Among them, the (meth)acrylate polymer, the (meth)acrylic acid (co)polymer, the vinyl ester (co)polymer, the polystyrene and the synthetic rubbers are preferably used.

The polymer particles may be prepared from a polymer synthesized by any known method such as an emulsion polymerization method, a suspension polymerization method, a solution polymerization method and a gas phase polymerization method. The particles of the polymer synthesized by the solution polymerization method or the gas phase polymerization method can be produced by a method in which an organic solution of the polymer is sprayed into an inactive gas and dried, and a method in which the polymer is dissolved in a water-immiscible solvent, then the resulting solution is dispersed in water or an aqueous medium and the solvent is removed by distillation. In both of the methods, a surfactant such as sodium lauryl sulfate, sodium dodecylbenzenesulfate or polyethylene glycol, or a water-soluble resin such as poly(vinyl alcohol) may be optionally used as a dispersing agent or stabilizing agent.

The heat fusible particles are preferably dispersible in water. The average particle size of the heat fusible particles is preferably from 0.01 to 10 μm, and more preferably from 0.1 to 3 μm. When a layer containing the heat fusible particles having an average particle size less than 0.01 μm is coated on the porous hydrophilic layer, the particles may enter the pores of the hydrophilic layer or the valleys between the neighboring two peaks on the hydrophilic layer surface, resulting in insufficient development on press and background contaminations. The heat fusible particles having an average particle size exceeding 10 μm may result in lowering of dissolving power.

Further, the composition of the heat fusible particles may be continuously varied from the interior to the surface of the particles. The particles may be covered with a different material. As a covering method, known methods such as a microcapsule method and a sol-gel method are usable. The heat fusible particle content of the layer is preferably from 1 to 90% by weight, and more preferably from 5 to 80% by weight based on the total weight of the layer.

The hydrophilic layer or another layer in the invention can contain a light heat conversion material as described later.

Examples of the light heat conversion material include the following substances:

(Infrared Absorbing Dye)

Examples of the light-heat conversion material include a general infrared absorbing dye such as a cyanine dye, a chloconium dye, a polymethine dye, an azulenium dye, a squalenium dye, a thiopyrylium dye, a naphthoquinone dye or an anthraquinone dye, and an organometallic complex such as a phthalocyanine compound, a naphthalocyanine compound, an azo compound, a thioamide compound, a dithiol compound or an indoaniline compound. Exemplarily, the light-heat conversion materials include compounds disclosed in Japanese Patent O.P.I. Publication Nos. 63-139191, 64-33547, 1-160683, 1-280750, 1-293342, 2-2074, 3-26593, 3-30991, 3-34891, 3-36093, 3-36094, 3-36095, 3-42281, 3-97589, 3-103476, 11-240270, 11-309952, 11-265062, 2000-1060, 2000-309174, 2001-152965, 2002-144750, and 2001-219667. These compounds may be used singly or in combination.

(Pigment)

Examples of pigment include carbon, graphite, a metal and a metal oxide. Furnace black and acetylene black is preferably used as the carbon. The graininess ($d_{50}$) thereof is preferably not more than 100 nm, and more preferably not more than 50 nm.

(Graphite)

The graphite is one having a particle size of preferably not more than 0.5 μm, more preferably not more than 100 nm, and most preferably not more than 50 nm.

(Metal)

As the metal, any metal can be used as long as the metal is in a form of fine particles having preferably a particle size of not more than 0.5 μm, more preferably not more than 100 nm, and most preferably not more than 50 nm. The metal may have any shape such as spherical, flaky and needle-like. Colloidal metal particles such as those of silver or gold are particularly preferred.

(Metal Oxide)

As the metal oxide, materials having black color in the visible regions or materials which are electro-conductive or semi-conductive can be used. Examples of the former include black iron oxide ($Fe_3O_4$), and black complex metal oxides containing at least two metals. Examples of the latter include Sb-doped $SnO_2$ (ATO), Sn-added $In_2O_3$ (ITO), $TiO_2$, TiO prepared by reducing $TiO_2$ (titanium oxide nitride, generally titanium black). Particles prepared by covering a core material such as $BaSO_4$, $TiO_2$, $9Al_2O_3.2B_2O$ and $K_2O.nTiO_2$ with these metal oxides is usable. The particle size of these particles is preferably not more than 0.5 μm, more preferably not more than 100 nm, and most preferably not more than 50 nm.

Among these light heat conversion materials, black complex metal oxides containing at least two metals are preferred. Typically, the black complex metal oxides include complex metal oxides comprising at least two selected from Al, Ti, Cr, Mn, Fe, Co, Ni, Cu, Zn, Sb, and Ba. These can be prepared according to the methods disclosed in Japanese Patent O.P.I. Publication Nos. 9-27393, 9-25126, 9-237570, 9-241529 and 10-231441.

The complex metal oxide used in the invention is preferably a complex Cu—Cr—Mn type metal oxide or a Cu—Fe—Mn type metal oxide. The Cu—Cr—Mn type metal oxides are preferably subjected to the treatment disclosed in Japanese Patent O.P.I. Publication Nos. 8-27393 in order to reduce isolation of a 6-valent chromium ion. These complex metal oxides have a high color density and a high light heat conversion efficiency as compared with another metal oxide.

The primary average particle size of these complex metal oxides is preferably from 0.001 to 1.0 μm, and more preferably from 0.01 to 0.5 μm. The primary average particle size of from 0.001 to 1.0 μm improves a light heat conversion efficiency relative to the addition amount of the particles, and the primary average particle size of from 0.05 to 0.5 μm further improves a light heat conversion efficiency relative to the addition amount of the particles. The light heat conversion efficiency relative to the addition amount of the particles depends on a dispersity of the particles, and the well-dispersed particles have a high light heat conversion efficiency. Accordingly, these complex metal oxide particles are preferably dispersed according to a known dispersing method, separately to a dispersion liquid (paste), before being added to a coating liquid for the particle containing layer. The metal oxides having a primary average particle size of less than 0.001 are not preferred since they are difficult to disperse. A dispersant is optionally used for dispersion. The addition amount of the dispersant is preferably from 0.01 to 5% by weight, and more preferably from 0.1 to 2% by weight, based on the weight of the complex metal oxide particles.

The addition amount of the complex metal oxide is preferably 0.1 to 50% by weight, more preferably 1 to 30% by weight, and most preferably 3 to 25% by weight based on the weight of hydrophilic layer or under layer.

(Water Soluble Material)

In the invention, the image formation layer containing heat fusible particles or heat melting particles can further contain a water soluble material. When an image formation layer at unexposed portions is removed on a press with dampening water or ink, the water soluble material makes it possible to easily remove the layer.

The image formation layer in the invention preferably contains saccharides, and more preferably contains oligosaccharides. Since the oligosaccharides are easily dissolved in water, removal on a press of unexposed portions of an oligosaccharide-containing layer can be easily carried out dissolving the saccharide in water. The removal does not require a specific system, and can be carried out conducting the same manner as in the beginning of printing of a conventional PS plate, which does not increase loss of prints at the beginning of printing. Use of the oligosaccharide does not lower hydrophilicity of the hydrophilic layer and can maintain good printing performance of the hydrophilic layer. The oligosaccharide is a water-soluble crystalline substance generally having a sweet taste, which is formed by a dehydration condensation reaction of plural monosaccharide molecules. The oligosaccharide is one kind of o-glycoside having a saccharide as the aglycon. The oligosaccharide is easily hydrolyzed by an acid to form a monosaccharide, and is classified according to the number of monosaccharide molecules of the resulting hydrolysis compounds, for example, into disaccharide, trisaccharide, tetrasaccharide, and pentasscharide. The oligosaccharide referred to in the invention means di- to deca-saccharides.

The oligosaccharide is classified into a reducing oligosaccharide and a non-reducing oligosaccharide according to presence or absence of a reducing group in the molecule. The oligosaccharide is also classified into a homo-oligosaccharide composed of the same kind of monosaccharide and a hetero-oligosaccharide composed of two or more kinds of monosaccharides. The oligosaccharide naturally exists in a free state or a glycoside state. Moreover, various oligosaccharides are formed by glycosyl transition by action of an enzyme.

(Exposure and Image Recording Method)

The present invention also provides a printing method which comprises the steps of imagewise heating a printing plate material for image recording, employing a thermal head or a thermal laser, and removing the component layer at non-image portions by development on press.

Image recording in the printing plate material of the invention is carried out by applying heat and can be carried out employing a thermal head used in a thermal printer, but is carried out preferably by thermal laser exposure.

Exposure applied in the invention is preferably scanning exposure, which is carried out employing a laser which can emit light having a wavelength of infrared and/or near-infrared regions, that is, a wavelength of from 700 to 1500 nm. As the laser, a gas laser can be used, but a semi-conductor laser, which emits light having a near-infrared region wavelength, is preferably used.

A device suitable for the scanning exposure in the invention may be any device capable of forming an image on the printing plate material according to image signals from a computer employing a semi-conductor laser.

Generally, the following scanning exposure processes are mentioned.

(1) A process in which a plate precursor provided on a fixed horizontal plate is scanning exposed in two dimensions, employing one or several laser beams.

(2) A process in which the surface of a plate precursor provided along the inner peripheral wall of a fixed cylinder is subjected to scanning exposure in the rotational direction (in the main scanning direction) of the cylinder, employing one or several lasers located inside the cylinder, moving the lasers in the normal direction (in the sub-scanning direction) to the rotational direction of the cylinder.

(3) A process in which the surface of a plate precursor provided along the outer peripheral wall of a fixed cylinder is subjected to scanning exposure in the rotational direction (in the main scanning direction) of the cylinder, employing one or several lasers located inside the cylinder, moving the lasers in the normal direction (in the sub-scanning direction) to the rotational direction of the cylinder.

In the invention, the process (3) above is preferable, and especially preferable when a printing plate material mounted on a plate cylinder of a printing press is scanning exposed.

Employing the thus printing plate material after image recording, printing is carried out without a special development, for example, development employing chemicals. After the printing plate material is imagewise exposed and mounted on a plate cylinder of a printing press, or after the printing plate material is mounted on the cylinder and then imagewise heated to obtain a printing plate material, a dampening water supply roller and/or an ink supply roller are brought into contact with the surface of the resulting printing plate material while rotating the plate cylinder to remove non-image portions of the component layer of the printing plate material (so-called, development on press).

The non-image portion removal after image recording as described above in the printing plate material of the invention can be carried out in the same sequences as in conventional PS plates. This means that processing time is shortened due to so-called development on press, resulting in lowering of cost.

It is preferred that the printing method in the invention comprises a step of drying a printing plate material, between the image recording (formation) step and a step of contacting a dampening water supply roller and/or an ink supply roller with the surface of the printing plate material.

EXAMPLES

The present invention will be explained below employing examples, but is not limited thereto.

Example 1

<<Preparation of Substrate>>

(Preparation of Substrate 1)

A 0.24 mm thick aluminum plate (1050, H16) was immersed in an aqueous 1% by weight sodium hydroxide solution at 50° C. to give an aluminum dissolution amount of 2 g/$m^2$, washed with water, immersed in an aqueous 0.1% by weight hydrochloric acid solution at 25° C. for 30 seconds to neutralize, and then washed with water.

Subsequently, the aluminum plate was subjected to an electrolytic surface-roughening treatment in an electrolytic solution containing 10 g/liter of hydrochloric acid and 0.5 g/liter of aluminum at a peak current density of 50 A/$dm^2$ employing an alternating current with a sine waveform, in which the distance between the plate surface and the electrode was 10 mm. The electrolytic surface-roughening treatment was divided into 12 treatments, in which the quantity of electricity used in one treatment (at a positive polarity) was 40 C/$dm^2$, and the total quantity of electricity used (at a positive polarity) was 480 C/$dm^2$. Standby time of 4 seconds, during which no surface-roughening treatment was carried out, was provided after each of the separate electrolytic surface-roughening treatments.

Subsequently, the resulting aluminum plate was immersed in an aqueous 1% by weight sodium hydroxide solution at 50° C. and etched to give an aluminum dissolution amount (including smut produced on the surface) of 2 g/$m^2$, washed with water, neutralized in an aqueous 10% by weight sulfuric acid solution at 25° C. for 10 seconds, and washed with water. Subsequently, the aluminum plate was subjected to anodizing treatment in an aqueous 20% by weight sulfuric acid solution at a constant voltage of 20 V, in which a quantity of electricity of 150 C/$dm^2$ was supplied, and washed with water.

The washed surface of the plate was squeegeed, and the plate was immersed in an aqueous 0.5% by weight sodium silicate (No. 3) at 70° C. for 30 seconds, washed with water, and dried at 80° C. for 5 minutes. Thus, substrate 1 was obtained.

(Preparation of Substrate 2)

Substrate 2 was prepared in the same manner as in substrate 1 above, except that the electrolytic surface-roughening treatment was divided into 10 treatments, and the total quantity of electricity used (at a positive polarity) was 400 C/$dm^2$.

(Preparation of Substrate 3)

Substrate 3 was prepared in the same manner as in substrate 2 above, except that the peak current density was 70 A/$dm^2$.

(Preparation of Substrate 4)

Substrate 4 was prepared in the same manner as in substrate 1 above, except that the electrolytic surface-roughening treatment was divided into 12 treatments, in which the quantity of electricity used in one treatment (at a positive polarity) was 50 C/$dm^2$, and the total quantity of electricity used (at a positive polarity) was 600 C/$dm^2$.

(Preparation of Substrate 5)

Substrate 5 was prepared in the same manner as in substrate 1 above, except that one electrolytic surface-roughening treatment was carried out without being separated.

(Preparation of Substrate 6)

A 0.24 mm thick aluminum plate (1050, H16) was brush grained according to a conventional method, employing a 400 mesh volcanic ash as an abrasive and a nylon brush, immersed in an aqueous 1% by weight sodium hydroxide solution at 50° C. to give an aluminum dissolution amount of 2 g/$m^2$, washed with water, immersed in an aqueous 0.1% by weight hydrochloric acid solution at 25° C. for 30 seconds to neutralize, and then washed with water.

The resulting plate was treated in the same manner as in substrate 1, except that one electrolytic surface-roughening treatment was carried out without being separated, and the quantity of electricity used (at a positive polarity) was 200 C/$dm^2$. Thus, substrate 6 was prepared.

(Measurement of Surface Configuration Parameters of Substrate)

The center line average surface roughness Ra, bearing length ration Mr2, oil retention depth Rvk, and oil-retention volume A2 were determined at a magnifying power of 40 employing a non-contact surface roughness measuring apparatus RSTPLUS, manufactured by WYKO Co., Ltd. The results are shown in Table 1.

TABLE 1

| | Surface configuration parameters of substrate | | | | | |
|---|---|---|---|---|---|---|
| Substrate No. | Ra (μm) | Mr2 (%) | 100-Mr2 (%) | Rvk (μm) | A2 | Remarks |
| 1 | 0.55 | 88.8 | 11.2 | 0.98 | 5.49 | Invention |
| 2 | 0.48 | 88.6 | 11.4 | 0.77 | 4.39 | Invention |
| 3 | 0.42 | 89.3 | 10.7 | 0.66 | 3.53 | Invention |
| 4 | 0.63 | 88.3 | 11.7 | 1.35 | 7.90 | Invention |
| 5 | 0.81 | 86.9 | 13.1 | 1.74 | 11.40 | Comparative |
| 6 | 0.66 | 78.8 | 21.2 | 1.56 | 16.54 | Comparative |

<<Preparation of Printing Plate Materials>>

(Preparation of Image Formation Layer Coating Solution)

An image formation layer coating solution having the following composition were prepared employing a polarity conversion polymer 1 synthesized according to a method disclosed in Japanese Patent O.P.I. Publication No. 2002-174893.

| <Composition of image formation layer coating solution> | |
|---|---|
| Polarity conversion polymer 1 | 3.40 parts by weight |
| Infrared absorbing dye YKR-2900 (produced by Yamamoto Kasei Co., Ltd.) | 0.60 parts by weight |
| 1-Methoxy-2-propanol | 48.00 parts by weight |
| Methanol | 48.00 parts by weight |

The solid content of the image formation layer coating solution was 4.0% by weight.

Polarity conversion polymer 1

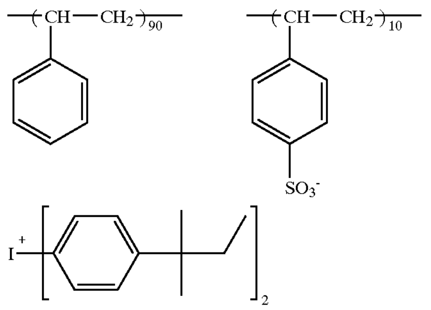

(Preparation of Printing Plate Material Sample Nos. 11 Through 16)

The image formation layer coating solution obtained above was coated on each of the substrates 1 through 6 prepared above to give a dry thickness of 1.2 g/$m^2$ according to a conventional method, and dried at 80° C. for 3 minutes. Thus, inventive sample Nos. 11 through 14, and comparative sample Nos. 15 and 16 were obtained.

<<Image Formation and Evaluation>>

[Image Formation]

Image formation was carried out by infrared laser exposure. Exposure was carried out employing an infrared laser (having a wavelength of 830 nm and a laser beam spot diameter of 18 μm) at a resolution of 2400 dpi to form an image including non-image portions (at exposed portions), the beam being focused on the surface of the image formation layer. In the exposure, the exposure energy on the image formation layer surface was varied from 150 to 300 mJ/$cm^2$ at an interval of 25 mJ/$cm^2$. The term, "dpi" shows the number of dots per 2.54 cm.

[Evaluation of Formed Image]

(Evaluation of Exposure Device Contamination Due to Exposure)

The surface to be exposed (to form non-image portions after development on press) of the printing plate material sample was covered with a 12 μm thick polyethylene terephthalate (PET) film, and exposure was carried out in the same manner as above. The PET film was removed, and deposits or colored deposits on the PET film were visually observed. Thus, exposure device contamination due to exposure was evaluated according to the following criteria.

A: There were no problems practically.

B: A few colored deposits were observed, which was practically admissible.

C: Many colored deposits were observed, which was practically problematic.

(Evaluation of Developability on Press)

<Printing Method>

The exposed printing plate material sample was mounted on the plate cylinder of a printing press, DAIYA 1F-1 produced by Mitsubishi Jukogyo Co., Ltd. Printing was carried out employing a coated paper, dampening water, a 2% by weight solution of Astromark 3 (produced by Nikken Kagaku Kenkyusyo Co., Ltd.), and printing ink (Toyo King Hyecho M Magenta, produced by Toyo Ink Manufacturing Co.). Printing was carried out in the same manner as in printing sequence carried out for a conventional PS plate, except that development employing a special developer was not carried out.

<Evaluation of Developability on Press>

Five hundred paper sheets were continuously printed. A five hundredth printed sheet was observed for stains at non-image portions, and evaluated according to the following criteria.

A: No stains were observed, and a good image quality was obtained.

B: A few stains were observed, which was practically admissible.

C: Many stains were observed, which was practically problematic.

The results are shown in Table 2.

TABLE 2

| Printing plate material | Substrate | Ablation due to exposure Exposure energy (mj/$cm^2$) | | | | | | | |
|---|---|---|---|---|---|---|---|---|---|
| Sample No. | No. | 150 | 175 | 200 | 225 | 250 | 275 | 300 | Remarks |
| 11 | 1 | A | A | A | A | B | B | C | Inv. |
| 12 | 2 | A | A | A | A | B | B | C | Inv. |
| 13 | 3 | A | A | A | A | B | B | C | Inv. |
| 14 | 4 | A | A | A | A | B | B | C | Inv. |
| 15 | 5 | A | A | A | B | B | C | C | Comp. |
| 16 | 6 | A | A | B | B | B | C | C | Comp. |

| Printing plate material | Substrate | Developability on press Exposure energy (mj/$cm^2$) | | | | | | | |
|---|---|---|---|---|---|---|---|---|---|
| Sample No. | No. | 150 | 175 | 200 | 225 | 250 | 275 | 300 | Remarks |
| 11 | 1 | B | B | A | A | A | A | A | Inv. |
| 12 | 2 | B | B | A | A | A | A | A | Inv. |
| 13 | 3 | B | B | A | A | A | A | A | Inv. |
| 14 | 4 | B | B | A | A | A | A | A | Inv. |
| 15 | 5 | C | C | B | B | A | A | A | Comp. |
| 16 | 6 | C | C | C | B | B | A | A | Comp. |

Inv.: Inventive,
Comp.: Comparative

As is apparent from Table 2, inventive printing plate material samples, employing a substrate having surface configuration parameters defined in the invention, provides reduced ablation in spite of exposure energy variation, and can employ an exposure energy range, which provides good developability on press and does not produce contamination of an exposure device used. That is, the inventive samples have a broad latitude of exposure.

Example 2

<<Preparation of Printing Plate Materials>>

<Preparation of Coating Solution>

(Preparation of Oleophilic Layer Coating Solution)

The following materials are mixed in order to obtain an oleophilic layer coating solution.

| <Composition of oleophilic layer coating solution> | |
|---|---|
| Colloidal silica Snowtex-XS (solid content of 20% by weight, produced by Nissan Kagaku Co., Ltd.) | 11.25 parts by weight |
| Acryl emulsion AE986A (solid content of 35.5% by weight, produced by JSR Co., Ltd.) | 4.23 parts by weight |
| Infrared absorbing dye ADS830WS (produced by American Dye Source Co., Ltd.) | 1.25 parts by weight |
| Pure water | 83.27 parts by weight |

The solid content of the oleophilic layer coating solution was 5.0% by weight.

(Preparation of Hydrophilic Layer Coating Solution)

The following materials are mixed in order to obtain an hydrophilic layer coating solution.

| <Composition of hydrophilic layer coating solution> | |
|---|---|
| Organosilica IPA-ST (solid content of 30% by weight, produced by Nissan Kagaku Co., Ltd.) | 22.67 parts by weight |
| Polyacrylic acid Julimer AC-10H (solid content of 20% by weight, produced by Nippon Junyaku Co., Ltd.) | 4.00 parts by weight |
| Aminopropyltriethoxysilane | 0.40 parts by weight |
| Pure water | 72.93 parts by weight |

The solid content of the hydrophilic layer coating solution was 8.0% by weight.

(Preparation of Hydrophilic Layer Coating Solution)

A 2% by weight aqueous solution of carboxymethylcellulose sodium salt was prepared as a protective layer coating solution.

[Preparation of Printing Plate Material Sample Nos. 21 Through 29]

The oleophilic layer coating solution, the hydrophilic layer coating solution, and the protective layer solution obtained above were coated on the substrate prepared in Example 1 to form an oleophilic layer, a hydrophilic layer and a protective layer, each layer having a dry thickness as shown in Table 3. In the above, each layer was dried at 100° C. for 3 minutes, and the resulting sample was further aged at 60° C. for 24 hours. Thus, inventive sample Nos. 21 through 26, and comparative sample Nos. 27 through 29 were obtained.

TABLE 3

| Printing plate material Sample No. | Substrate No. | Dry thickness of oleophilic layer ($g/m^2$) | Dry thickness of hydrophilic layer ($g/m^2$) | Dry thickness of protective layer ($g/m^2$) | Remarks |
|---|---|---|---|---|---|
| 21 | 1 | 0.8 | 0.7 | 0.2 | Inv. |
| 22 | 2 | 0.8 | 0.7 | 0.2 | Inv. |
| 23 | 3 | 0.8 | 0.7 | 0.2 | Inv. |
| 24 | 4 | 0.8 | 0.7 | 0.2 | Inv. |
| 25 | 2 | 0.8 | 0.7 | — | Inv. |
| 26 | 3 | 0.8 | 0.7 | — | Inv. |
| 27 | 5 | 0.8 | 0.7 | 0.2 | Comp. |
| 28 | 6 | 0.8 | 0.7 | 0.2 | Comp. |
| 29 | 6 | 0.8 | 0.7 | — | Comp. |

Inv: Inventive,
Comp.: Comparative

<<Image Formation and Evaluation>>

[Image Formation]

Image formation was carried out by infrared laser exposure. Exposure was carried out employing an infrared laser (having a wavelength of 830 nm and a laser beam spot diameter of 18 $\mu$m) at a resolution of 2400 dpi to form an image, the beam being focused on the surface of the image formation layer. In the exposure, the exposure energy on the image formation layer surface was varied from 300 to 600 $mJ/cm^2$ at an interval of 50 $mJ/cm^2$. A solid image, and two kinds of line images and spacing (in the direction (longitudinal direction) parallel to the moving direction of the laser beam and in the direction (lateral direction) perpendicular to the moving direction of the laser beam) of 2400 dpi were employed for evaluation.

It was confirmed in the samples having no protective layer that after exposure, at least a part of the hydrophilic layer at exposed portions remained without being removed.

[Evaluation of Formed Image]

<Printing Method>

The exposed printing plate material sample was mounted on the plate cylinder of a printing press, DAIYA 1F-1 produced by Mitsubishi Jukogyo Co., Ltd. Printing was carried out employing a coated paper, dampening water, a 2% by weight solution of Astromark 3 (produced by Nikken Kagaku Kenkyusyo Co., Ltd.), and printing ink (Toyo King Hyecho M Magenta, produced by Toyo Ink Manufacturing Co.). Printing was carried out in the same manner as in printing sequence carried out for a conventional PS plate, except that development employing a special developer was not carried out.

(Ink Receptivity at Solid Image Portions)

The number of paper sheet printed from when printing started till when the hydrophilic layer remaining at solid image portions was removed to give a proper optical density (1.5) at the solid image portions was counted.

(Evaluation of Images 1)

Images 1, referring to the line images of the line images and spacing, were observed in one hundredth printed paper sheet after printing started, and evaluated according to the following criteria:

A: Continuous line images both in the longitudinal direction and in the lateral direction were formed.

B: Discontinuity was observed at a part of either the line image in the longitudinal direction or the lime image in the lateral direction, but it was practically acceptable.

C: Discontinuity was observed both in the line image in the longitudinal direction and in the line image in the lateral direction, and it was practically problematic.

(Evaluation of Images 2)

Images 2, referring to the spacing of the line images and spacing, were observed in one hundredth printed paper sheet, and evaluated according to the following criteria:

A: A continuous spacing (a white line) was formed both in the longitudinal direction and in the lateral direction.

B: Discontinuity (inking) was observed at a part of either the spacing in the longitudinal direction or in the spacing in the lateral direction, but it was practically acceptable.

C: Discontinuity (inking) was observed (both) in some of the spacing in the longitudinal direction and in some of the spacing in the lateral direction, and it was practically problematic.

The results are shown in Table 4.

TABLE 4

| Evaluation | Exposure energy ($mJ/cm^2$) | Printing plate material Sample No. 21 | 22 | 23 | 24 | 25 | 26 | 27 | 28 | 29 |
|---|---|---|---|---|---|---|---|---|---|---|
| Ink receptivity at solid image portions (by number) | 300 | >5000 | >5000 | >5000 | >5000 | >5000 | >5000 | >5000 | >5000 | >5000 |
| | 350 | 2000 | 2000 | 2000 | 2000 | 1000 | 1000 | >5000 | >5000 | >5000 |
| | 400 | 500 | 500 | 500 | 500 | 200 | 200 | >5000 | >5000 | >5000 |
| | 450 | <100 | <100 | <100 | <100 | <100 | <100 | 3000 | 4000 | 3000 |
| | 500 | <100 | <100 | <100 | <100 | <100 | <100 | 500 | 1000 | 500 |
| | 550 | <100 | <100 | <100 | <100 | <100 | <100 | <100 | 300 | <100 |
| | 600 | <100 | <100 | <100 | <100 | <100 | <100 | <100 | <100 | <100 |
| Images 1 | 300 | C | C | C | C | C | C | C | C | C |
| | 350 | C | C | C | C | C | C | C | C | C |
| | 400 | B | B | B | B | B | B | C | C | C |
| | 450 | A | A | A | A | A | A | C | C | C |
| | 500 | A | A | A | A | A | A | B | C | B |
| | 550 | A | A | A | A | A | A | A | B | A |
| | 600 | A | A | A | A | A | A | A | A | A |
| Images 2 | 300 | A | A | A | A | A | A | A | A | A |
| | 350 | A | A | A | A | A | A | A | A | A |
| | 400 | A | A | A | A | A | A | A | A | A |
| | 450 | A | A | A | A | A | A | A | A | B |
| | 500 | B | B | B | B | B | B | B | B | B |
| | 550 | B | B | B | B | B | B | B | B | C |
| | 600 | C | C | C | C | C | C | C | C | C |
| Remarks | | Inv. | Inv. | Inv. | Inv. | Inv. | Inv. | Comp. | Comp. | Comp. |

Inv.; Inventive
Comp.; Comparative

As is apparent from Table 5, inventive printing plate material samples, comprising a substrate having surface configuration parameters defined in the invention and an ablation type layer (a layer to be ablated by exposure) provided thereon, have a broad latitude of exposure which provides a satisfactory image quality, as compared with comparative printing plate material samples.

Example 3

<<Preparation of Printing Plate Materials>>

<Preparation of Coating Solution>

(Preparation of Heat Melting Layer 1 Coating Solution)

The following materials are mixed in order, and a heat melting layer 1 coating solution was obtained.

| <Composition of heat melting layer 1 coating solution> | |
|---|---|
| Carnauba wax emulsion A118 (solid content of 40% by weight, produced by Gifu Shellac Co., Ltd.) | 14.00 parts by weight |
| Trehalose Treha mp. 97° C., produced by Hayashibara Shoji Co., Ltd.) | 7.00 parts by weight |
| Infrared absorbing dye ADS830WS (produced by American Dye Source Co., Ltd.) | 0.70 parts by weight |
| Pure water | 78.3 parts by weight |

The solid content of the heat melting layer 1 coating solution was 7.0% by weight.

(Preparation of Heat Melting Layer 2 Coating Solution)

The following materials are mixed in order, and a heat melting layer 2 coating solution was obtained.

| <Composition of heat melting layer 2 coating solution> | |
|---|---|
| PMMA Emulsion Epostar MX-030W (solid content of 10% by weight, produced by Nippon Shokubai Co., Ltd.) | 56.00 parts by weight |
| Polyacrylic acid Julimer AC-10S (solid content of 40% by weight, produced by Nippon Junyaku Co., Ltd.) | 1.75 parts by weight |
| Infrared absorbing dye ADS830WS (produced by American Dye Source Co., Ltd.) | 0.70 parts by weight |
| Pure water | 41.55 parts by weight |

The solid content of the heat melting layer 2 coating solution was 7.0% by weight.

[Preparation of Printing Plate Material Sample Nos. 31 Through 39]

The heat melting layer coating solution 1 or heat melting layer coating solution 2 obtained above was coated on the substrate prepared in Example 1 to give a dry thickness as shown in Table 5. In the above, each heat melting layer was dried at 100° C. for 3 minutes, and the resulting sample was further aged at 40° C. for 72 hours. Thus, inventive sample Nos. 31 through 36, and comparative sample Nos. 37 through 39 were obtained.

<<Image Formation and Evaluation>>

(Image Formation)

Image formation was carried out by infrared laser exposure. Exposure was carried out employing an infrared laser (having a wavelength of 830 nm and a beam spot diameter of 18 μm) at an exposure energy of 350 mJ/$cm^2$, at a resolution of 2400 dpi and at a screen line number of 175 to form an image, the beam being focused on the surface of the image formation layer. An image with a dot area of 50% and an image with a dot area of 90% were employed as images for evaluation.

[Evaluation of Formed Images]

(Printing Method)

The exposed printing plate material sample was mounted on the plate cylinder of a printing press, DAIYA 1F-1 produced by Mitsubishi Jukogyo Co., Ltd. Printing was carried out employing a coated paper, dampening water, a 2% by weight solution of Astromark 3 (produced by Nikken Kagaku Kenkyusyo Co., Ltd.), and printing ink (Toyo King Hyecho M Magenta, produced by Toyo Ink Manufacturing Co.). Printing was carried out in the same manner as in printing sequence carried out for a conventional PS plate, except that development employing a special developer was not carried out.

(Evaluation of Developability on Press)

The number of paper sheets printed from when printing started until when development on press was completed was determined. The unexposed portions (non-image portions), image portions with a dot area of 50% and image portions with a dot area of 90% of the prints were observed. It was judged that development on press was completed when no stains at non-exposed portions were observed and doted images were completely reproduced in a paper sheet to have been printed.

The results are shown in Table 5.

TABLE 5

| Printing plate material Sample No. | Substrate No. | Heat melting layer 1 (g/$m^2$) | Heat melting layer 2 (g/$m^2$) | Developability on press (by number) Non-image portions | Image portions with a dot area of 50% | Image portions with a dot area of 90% | Remarks |
|---|---|---|---|---|---|---|---|
| 31 | 1 | 0.8 | | 10 | 10 | 15 | Inv. |
| 32 | 2 | 0.6 | | 10 | 10 | 15 | Inv. |
| 33 | 3 | 0.7 | | 10 | 10 | 15 | Inv. |
| 34 | 4 | 0.7 | | 10 | 10 | 15 | Inv. |
| 35 | 2 | | 0.8 | 15 | 15 | 20 | Inv. |
| 36 | 4 | | 0.5 | 15 | 15 | 20 | Inv. |
| 37 | 5 | 0.7 | | 20 | 20 | 40 | Comp. |
| 38 | 6 | 0.6 | | 25 | 25 | 50 | Comp. |
| 39 | 6 | | 0.8 | 35 | 35 | 60 | Comp. |

Inv.: Invention,
Comp.: Comparative

As is apparent from Table 5, inventive printing plate material samples, comprising a substrate having surface configuration parameters defined in the invention and a heat melting layer provided thereon, provides good developability on press as compared with comparative printing plate material samples.

Example 7

<<Preparation of Substrate 7>>

Ninety eight parts by weight (by solid) of colloidal silica (Snowtex-XS, produced by Nissan Kagaku Co., Ltd.) and 2 parts by weight of montmorillonite (Mineral Colloid MO, produced by Southern Clay Products Co., Ltd.) were mixed in a homogenized while vigorously stirring to prepare a hydrophilic filler layer solution having a solid content of 5% by weight. The resulting hydrophilic filler layer solution was coated on the substrate 6 prepared in Example 1 to give a hydrophilic filler layer with a dry thickness of 0.4 g/$m^2$, dried at 100° C. for 3 minutes, and further aged at 55° C. for 72 hours. Thus, substrate 7 was obtained.

In substrate 7, deep pits were charged with the hydrophilic filler layer. A2 was measured to be 6.73.

<<Preparation and Evaluation of Printing Plate Material Samples>>

The heat melting layer 1 coating solution was coated on the substrate 7 obtained above in the same manner as in Example 3, except that a dry thickness of the heat melting layer 1 was 0.6 g/$m^2$. Thus, a printing plate material sample 41 was obtained. Employing the printing plate material sample 41, exposure and printing were carried out in the same manner as in Example 3. Evaluation was carried out for developability on press in the same manner as in Example 3.

The results are as follows:

Developability on press is 10 paper sheets at non-image portions, 10 paper sheets at image portions with a dot area of 50%, and 15 paper sheets at image portions with a dot area of 90%, which shows excellent results.

As is apparent from the above, the substrate, in which the deep pits are charged with the hydrophilic filler layer to obtain an A2 falling within the scope of the invention, also provides good printability.

EFFECTS OF THE INVENTION

The present invention can provide a printing plate material, which is capable of recording an image employing infrared laser, exhibiting improved sensitivity and developability, and giving high image quality.

What is claimed is:

1. A printing plate material comprising a substrate and a component layer provided thereon, the substrate having a center line average surface roughness Ra of from 0.2 to 1.0 μm, and an oil-retention volume A2 of from 1 to 10, wherein the center line average surface roughness Ra is obtained from three dimension surface roughness measurement according to JIS-B-0601, and wherein an image is capable of being recorded on the component layer by imagewise exposure of infrared laser.

2. The printing plate material of claim 1, wherein the substrate is an aluminum or aluminum alloy plate which has been subjected to surface roughening treatment, followed by anodizing treatment or hydrophilization treatment.

3. The printing plate material of claim 1, wherein the substrate is a surface roughened aluminum or aluminum alloy plate having deep pits charged with a hydrophilic material or an oleophilic material.

4. The printing plate material of claim 1, wherein the oil-retention volume A2 is from 2 to 8.

5. The printing plate material of claim 1, the component layer being an oleophilic layer, wherein the printing plate material is positive working, and the oleophilic layer at exposed portions is capable of being removed by development on press.

6. The printing plate material of claim 5, wherein the oleophilic layer varies from hydrophobic to hydrophilic by heating.

7. The printing plate material of claim 1, the component layer being comprised of an oleophilic layer and a hydrophilic layer provided on the oleophilic layer, wherein the printing plate material is negative working, and the hydrophilic layer at exposed portions is capable of being removed by development on press.

8. The printing plate material of claim 1, the component layer being comprised of a hydrophilic layer and an oleophilic layer provided on the hydrophilic layer, wherein the printing plate material is positive working, and at least the oleophilic layer at exposed portions is capable of being removed by development on press.

9. The printing plate material of claim 1, the component layer being capable of being removed by development on press and containing heat melting particles or heat fusible particles, wherein the printing plate material is negative working, and the component layer at exposed portions is incapable of being removed by development on press.

10. The printing plate material of claim 1, wherein the printing material after image recording is capable of being developed with water.

11. The printing plate material of claim 1, wherein the printing material after image recording is capable of being developed on a printing press by supplying a dampening water and/or printing ink.

* * * * *